(12) United States Patent
Fielding et al.

(10) Patent No.: US 8,241,386 B2
(45) Date of Patent: Aug. 14, 2012

(54) APPARATUS FOR FILTERING GASES AND METHOD OF MANUFACTURING SAME

(76) Inventors: Joseph Ronald Fielding, Dunkirk, MD (US); Paul Thomas Street, Yorktown, VA (US)

( * ) Notice: Subject to any disclaimer, the term of this patent is extended or adjusted under 35 U.S.C. 154(b) by 703 days.

(21) Appl. No.: 12/350,478

(22) Filed: Jan. 8, 2009

(65) Prior Publication Data

US 2010/0050580 A1 Mar. 4, 2010

Related U.S. Application Data

(60) Provisional application No. 61/136,361, filed on Aug. 29, 2008.

(51) Int. Cl.
*B01D 39/00* (2006.01)
(52) U.S. Cl. ............... 55/505; 55/476; 55/521; 55/507; 55/525; 55/523
(58) Field of Classification Search .................. 55/505, 55/476, 521, 507, 525, 523
See application file for complete search history.

(56) References Cited

U.S. PATENT DOCUMENTS

| | | | | |
|---|---|---|---|---|
| 3,289,847 A | * | 12/1966 | Rothemund | 210/266 |
| 3,950,251 A | * | 4/1976 | Hiller | 210/232 |
| 4,046,692 A | * | 9/1977 | Braukmann et al. | 210/108 |
| 4,198,726 A | * | 4/1980 | Powell, Jr. | 15/312.2 |
| 5,024,764 A | * | 6/1991 | Holler | 210/484 |
| 5,104,537 A | * | 4/1992 | Stifelman et al. | 210/440 |
| 5,158,586 A | | 10/1992 | Layton et al. | |
| 5,293,935 A | | 3/1994 | Arterbury et al. | |
| 6,096,197 A | * | 8/2000 | Hughes | 210/94 |
| 6,117,332 A | * | 9/2000 | Hatch et al. | 210/697 |
| 6,325,926 B1 | * | 12/2001 | Hansen | 210/209 |
| 6,652,615 B2 | * | 11/2003 | Quick et al. | 55/502 |
| 6,866,700 B2 | * | 3/2005 | Amann | 95/273 |
| 7,087,166 B1 | * | 8/2006 | Sudo et al. | 210/232 |
| 7,264,652 B2 | * | 9/2007 | Honda et al. | 95/132 |
| 7,604,128 B2 | * | 10/2009 | Dworatzek et al. | 210/455 |
| 2004/0040274 A1 | * | 3/2004 | Amann | 55/498 |

FOREIGN PATENT DOCUMENTS
KR 1020040045038 A 5/2004

OTHER PUBLICATIONS
International Search Report dated Jan. 27, 2010 in corresponding international patent application No. PCT/US2009/048994, 3 pages.

* cited by examiner

*Primary Examiner* — Jason M Greene
*Assistant Examiner* — Dung H Bui
(74) *Attorney, Agent, or Firm* — Maier & Maier, PLLC

(57) ABSTRACT

A filter element may be provided. The filter element may include a fitting; and a filtering member coupled to the fitting, the filtering member may include a plurality of flutes defined in an outer surface of the filtering member.

4 Claims, 10 Drawing Sheets

Minimum Oxygen Pressure Required to Support Self-Sustained Combustion of Approximately 15-cm (6-in.) long, 0.32-cm (0.125-in.)-Diameter Rods Ignited at the Bottom

| Material | Threshold Pressure | | Next Lower Pressure Tested (psia) |
|---|---|---|---|
| | (MPa) | (psia) | |
| Commercially pure Ag | >ᵃ68.9 | >ᵃ10 000 | |
| Monel® K-500 | >ᵃ68.9 | >ᵃ10 000 | |
| Inconel® MA 754 | >ᵃ68.9 | >ᵃ10 000 | |
| Monel® 400 | >ᵃ68.9 | >ᵃ10 000 | |
| Brass 360 CDA | >ᵃ68.9 | >ᵃ10 000 | |
| Cu-2 Be | >ᵃ68.9 | >ᵃ10 000 | |
| Nickel 200 | >ᵃ55.2 | >ᵃ 8 000 | |
| Copper 102 | >ᵃ55.2 | >ᵃ 8 000 | |
| Red Brass | >ᵃ48.3 | >ᵃ 7 000 | |
| Tin Bronze | >ᵃ48.3 | >ᵃ 7 000 | |
| Yellow Brass | >ᵃ48.3 | >ᵃ 7 000 | |
| Haynes® 188 | 34.5 | 5 000 | 3 000 |
| Haynes® 242 | 34.5 | 5 000 | 3 000 |
| Hastelloy® C22 | 34.5 | 5 000 | 1 000 |
| Hastelloy® C276 | 20.7 | 3 000 | 1 000 |
| Inconel® 600 | 20.7 | 2 500 | 1 000 |
| Stellite® 6 | 20.7 | 2 500 | 1 000 |
| Inconel® 625 | 20.7 | 2 500 | 1 000 |
| 440C SS | 17.2 | 2 500 | 1 000 |
| MP 35N | 13.8 | 2 000 | 1 500 |
| Elgiloy® | 13.8 | 2 000 | 1 500 |
| Udimet 700 | 6.9 | 1 000 | 500 |
| Haynes® G3 | 6.9 | 1 000 | 500 |
| Inconel® 718 | 6.9 | 1 000 | 750 |
| Waspaloy | 6.9 | 1 000 | 500 |
| Invar® 36 | ≤ᵇ6.9 | ≤ᵇ1 000 | None |
| 304 SS | 6.9 | 1 000 | 500 |
| Colmonoy® | 6.9 | 1 000 | 500 |
| 17-4 PH | 6.9 | 1 000 | 500 |
| 303 SS | ≤ᵇ6.9 | ≤ᵇ1 000 | None |

ᵃ  > indicates that this was the highest pressure tested and the material did not support self-sustained combustion. The threshold pressure, if it exists, is greater than the stated value.
ᵇ  ≤ indicates that no tests were conducted at lower pressures and therefore the threshold pressure is less than or equal to the stated value.

*Fig. 6*

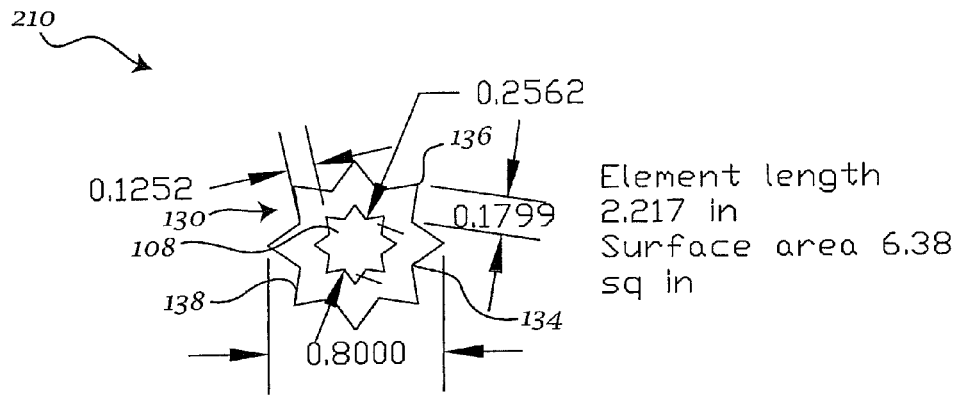
Fig. 12a — Element length 2.217 in, Surface area 6.38 sq in
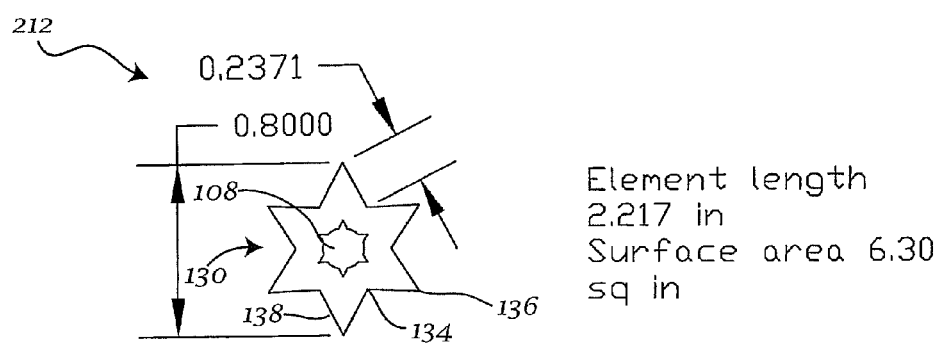
Fig. 12b — Element length 2.217 in, Surface area 6.30 sq in
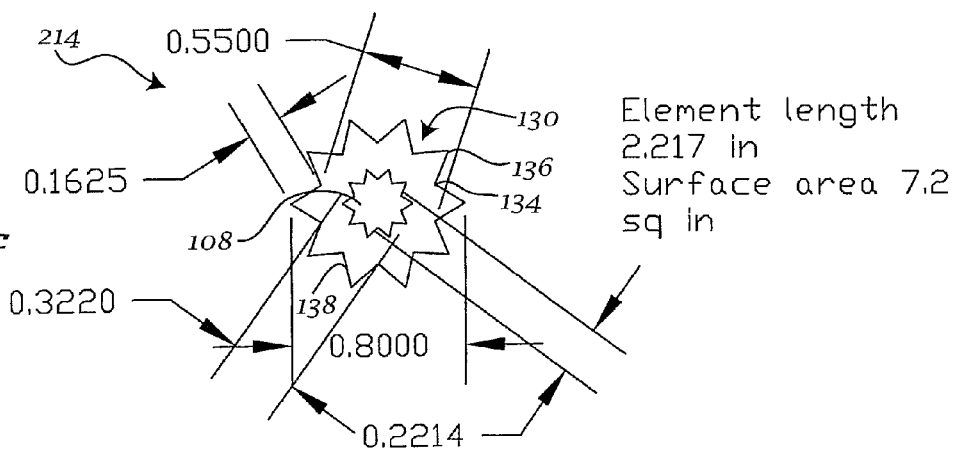
Fig. 12c — Element length 2.217 in, Surface area 7.2 sq in

APPARATUS FOR FILTERING GASES AND METHOD OF MANUFACTURING SAME

CROSS-REFERENCE TO RELATED APPLICATIONS

This application claims priority to U.S. Provisional Application No. 61/136,361, filed Aug. 29, 2008, and entitled SINTERED FILTER, the entire contents of which are hereby incorporated by reference.

BACKGROUND OF THE INVENTION

Sintering is a process of forming objects from metallic powder by applying heat to the powder. In one known example, sintering involves heating metal powder to a temperature that is below the melting point of the metal powder. Although the metal powder does not melt during this process, a coherent bonded mass may be formed. Some known examples of sintering are the manufacture of ceramic objects, the manufacture of bearings and the process of powder metallurgy.

Sintered bronze for example, is a porous material manufactured by heating metal bronze powder below its melting point until the particles adhere to each other. Sintered bronze may be used as a filter. The advantages of using sintered bronze as a filtering material include its ability to regenerate the filter element as well as its ability to filter small particles with high precision. Sintered bronze also has superior performance when filtering highly flammable gases such as oxygen, and is therefore desirable as a filter material in applications such as diving systems or other compressed oxygen systems.

Some of the existing sintered filters that are used in scuba diving apparatuses are manufactured in tubes. Consequently, these sintered bronze filters generally have two to three times less surface area than conventional pleated wire mesh designs. This leads to a number of disadvantages in using sintered bronze tube filters as opposed to pleated wire mesh filters, such as a low dirt holding capacity and a high pressure drop across the filter element.

BRIEF DESCRIPTION OF THE INVENTION

In one exemplary embodiment, a filter element may be provided. The filter element may include a fitting; and a filtering member coupled to the fitting, the filtering member may include a plurality of flutes defined in an outer surface of the filtering member.

In another exemplary embodiment, a filtering system may be provided. The filtering system may include a housing that may include a cavity defined therein; a housing cap that may be threadably coupled to the housing; and a filter element that may have a fitting and a filtering member coupled to the fitting, the filtering member may include a plurality of flutes defined in an outer surface of the filtering member, the filter element may be threadably coupled to the housing cap and positioned substantially within the cavity such that a substantially annular space is defined between the filter element and the housing.

In yet another exemplary embodiment, a method of assembling a filtering system may be provided. The method may include molding metal powder into a filtering member; positioning a receiving end of a fitting at least partially within the metal powder; forming a filter element by heating the metal powder to a temperature that is substantially less than a melting temperature of the metal powder such that the metal powder couples to the fitting to form a filter element; and coupling the filter element within a cavity defined within a housing.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 6 is a chart reporting minimum oxygen pressure required to support self-sustained combustion of rods ignited at the bottom, which may be used with the filtering system shown in FIG. 5;
FIG. 7b is a cross-section side view of the filtering member shown in FIG. 7a;
FIG. 7c is a side view of the filtering member shown in FIG. 7a;
FIG. 9b is a cross-sectional side view of the fitting shown in FIG. 9a;
FIG. 12a is a cross-sectional front view of an alternative filtering member;
FIG. 12b is a cross-sectional front view of an alternative filtering member;
FIG. 12c is a cross-sectional front view of an alternative filtering member.

DETAILED DESCRIPTION OF THE INVENTION

Figure 1:
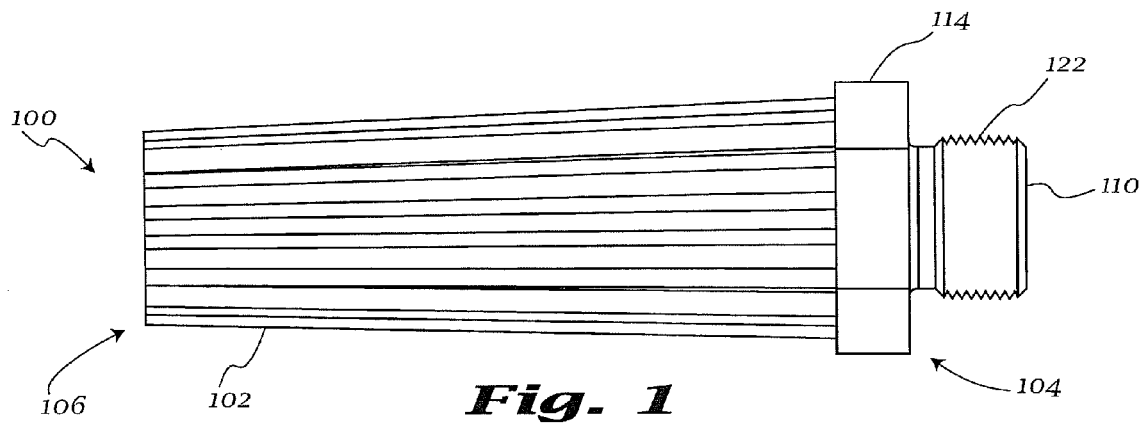
FIG. 1 is a side view of a sintered filtering member.
Figure 2:
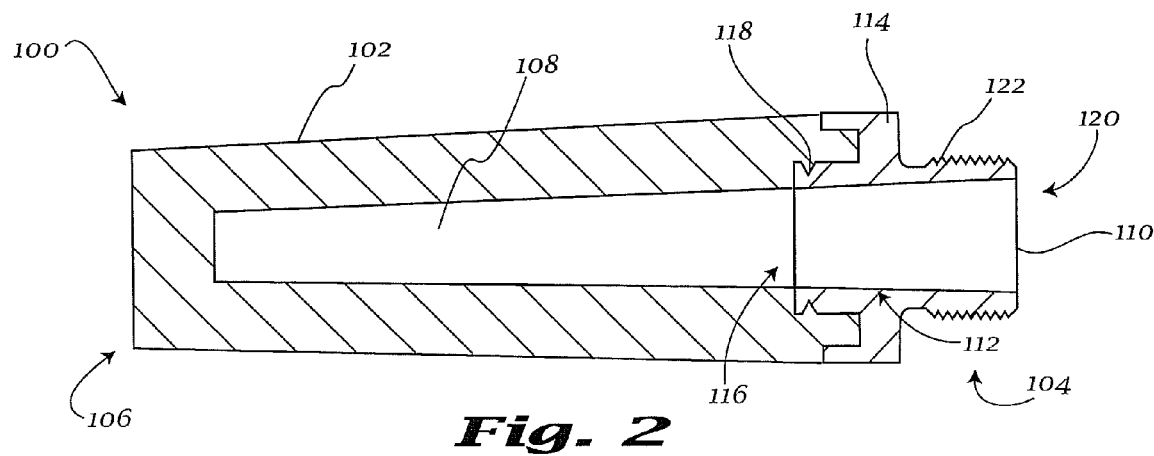
FIG. 2 is a cross-sectional side view of the filtering member shown in FIG. 1.

Aspects of the sintered filter are disclosed in the following description and related drawings directed to specific embodiments of the sintered filter. Alternate embodiments may be devised without departing from the spirit or the scope of the sintered filter. Additionally, well-known elements of exemplary embodiments of the sintered filter will not be described in detail or will be omitted so as not to obscure the relevant details of the sintered filter. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the sintered filter" does not require that all embodiments of the sintered filter include the discussed feature, advantage or mode of operation.

The article, Schadler, J. L. and Stotzfus, J. M., "Pressurized Flammability Limits of Selected Sintered Filter Materials in High Pressure Gaseous Oxygen," *Flammability and Sensitivity of Materials in Oxygen-Enriched Atmospheres: 6th Volume, ASTM STP* 1197, Dwight D. Janoff and Joel M. Stoltzfus, Eds., American Society for Testing and Materials, Philadelphia, 1993, is hereby incorporated by reference in its entirety.

As generally shown in FIGS. 1-5, exemplary embodiments of a filter 100 are shown. Filter 100 may include a substantially porous filtering member 102 coupled to a fitting 104. Filtering member 102 may be made of sintered brass, bronze, stainless steel, nickel, other sintered metal-based materials and/or any other material capable of precisely filtering highly flammable gas. In one embodiment, filtering member 102 may filter particles having a diameter ranging between about 0.1 µm to about 500 µm. In another embodiment, filtering member 102 may filter particles having a diameter between about 0.5 µm to about 100 µm. In yet another embodiment, filtering member 102 may filter particles having a diameter of about 10 µm. Moreover, filtering member 102 may be molded, or otherwise formed, in a generally cylindrical shape. In an exemplary embodiment, filtering member 102 may be tapered such that an end adjacent fitting 104 may have a substantially larger diameter than the diameter of a distal end 106. Moreover, filtering member 102 and fitting 104 may include a filter cavity 108 that is defined within filtering member 102 and fitting 104 and extends substantially axially therethrough. In one example, filter cavity 108 may terminate substantially near distal end 106 and may extend substantially through fitting 104. Moreover, fitting 104 may include a fitting outlet aperture 110 that is coupled in flow communication with filter cavity 108 such that filter cavity 108 facilitates channeling filtered gas through fitting outlet aperture 110, as described in more detail below.

Fitting 104 may include a substantially cylindrical-shaped body portion 112 that may have an annular shaped flange 114 that extends substantially radially therefrom. Body portion 112 may include a first fitting end 116 that may have an annular notch 118 defined therein, and a second fitting end 120 that may have a plurality of threads 122 defined therein. An annular fitting ring seal 124 (shown in FIG. 5) may be coupled to second fitting end 120 and positioned between the plurality of threads 122 and flange 114. Moreover, in the exemplary embodiment, flange 114 may include a collar portion 126 and a receiving portion 128. Collar portion 126 may extend in a substantially longitudinal direction away from fitting outlet aperture 110. In one embodiment, receiving portion 128 may be configured to receive at least a portion of filtering member 102.

Figure 3:
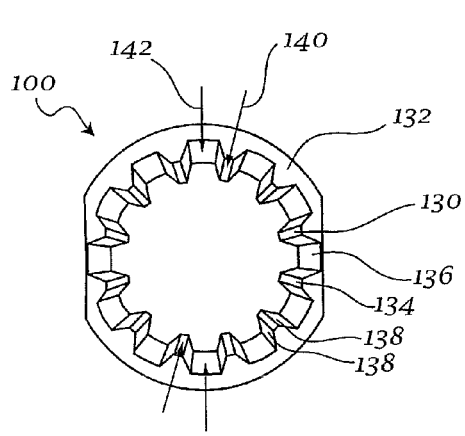
FIG. 3 is a front view of the filtering member shown in FIG. 1.
Figure 4:
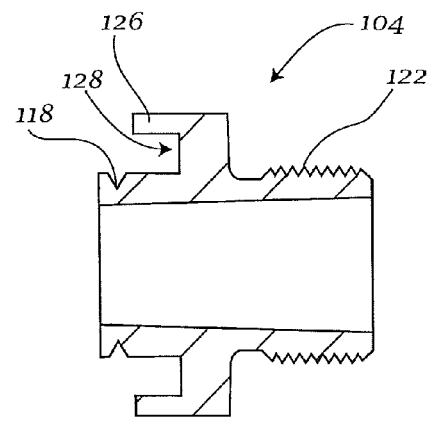
FIG. 4 is a cross-sectional side view of a fitting that may be used with the filtering member shown in FIG. 1.

In one exemplary embodiment, as shown in FIG. 3, filtering member 102 may be molded, or otherwise formed such that filtering member 102 has a plurality of flutes 130 defined in an outer surface of filtering member 102. Flutes 130 may extend substantially axially such that filtering member 102 has cross-section that is substantially gear-shaped. In such an embodiment, the plurality of flutes 130 facilitates increasing the surface area of filtering member 102 which may be exposed to potentially unfiltered gas, as described in more detail below. In one embodiment, one end of flutes 130 may terminate or abut a receiving face 132 of fitting 104, as shown in FIG. 3. Alternatively, filtering member 102 may have a plurality of flutes that produce cross-sectional shapes that include, but not limited to, a star shaped, a cylindrical shaped or any other desired cross-sectional shape that enables filter 100 to function as described herein.

In the exemplary embodiment, the plurality of flutes 130 may have a cross-sectional shape that is substantially V-shaped. Each flute 130 may have a radially inner valley or trough portion 134. Moreover, a radially outer peak portion 136 may be defined between two circumferentially adjacent flutes 130. A pair of flute walls 138 may extend between valley portion 134 and peak portion 136. As a result, a radially inner or first diameter 140 measured between a pair of diametrically opposed valley portions 134 may be smaller than a radially outer or second diameter 142 measured between a pair of diametrically opposed peak portions 136.

In one embodiment, filter 100 may be formed by a sintering process. For example, filter 100 may be formed by placing fitting 104 into a mold or cast (not shown) to form filtering member 102. Metal powder such as, but not limited to, brass, bronze, nickel, stainless steel or any other desired material, may be filled within the mold. Fitting 104 may be positioned substantially adjacent the mold such that a portion of the metal powder may also fill receiving portion 128 and notch 118 of fitting 104. Once the powder material is filled within the mold, the metal powder may be sintered while filtering member 102 and fitting 104 are positioned adjacent one another. As filtering member 102 is sintered, filtering member 102 may be bonded or coupled to fitting 104. Alternatively, filtering member 102 may be coupled to fitting 104 using brazing, crimping or any other desired attachment method or mechanism that enables filter 100 to function as described herein.

Figure 5:
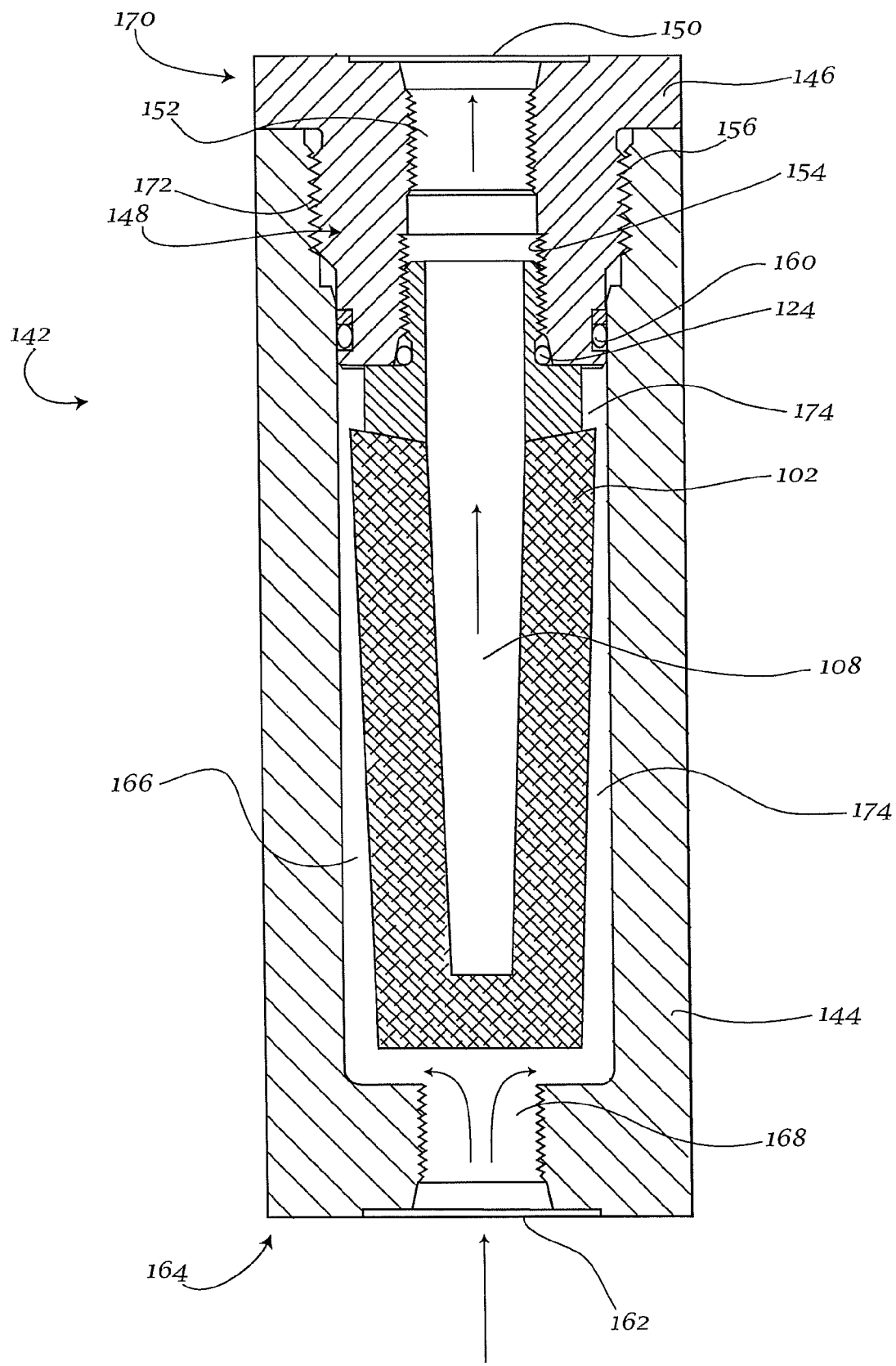
FIG. 5 is a cross-sectional side view of filtering system.

FIG. 5 is a cross-sectional side view of a filtering system 142. In the exemplary embodiment, filtering system 142 may include a housing 144, a housing cap 146 and filter 100. Housing cap 146 may include a substantially cylindrical-shaped cap body portion 148 and a flange radially extending therefrom. Cap body portion 148 may include a cap outlet aperture 150 and a cap passageway 152 defined therein, wherein the cap passageway is further defined by an interior wall that includes a plurality of threads 154 defined thereon. Cap body portion 148 may also include an outer threaded portion 156 and a non-threaded portion. In one embodiment, the non-threaded portion may include a cap ring seal 160 coupled thereto, as described in more detail below. Housing 144 may have a substantially cylindrical shape and include an inlet aperture 162 defined in a first end 164. Housing may also include a cavity 166 defined therein. Moreover, housing 144 may include an inlet passageway 168 defined in first end 164 that facilitates channeling gas from inlet aperture 162 to cavity 166. In the exemplary embodiment, housing 144 may include a second end 170 that has a plurality of threads 172 defined therein. The threads facilitate threadably coupling housing cap 146 to housing 144, as described below.

Filtering system 142 may be assembled by threadably coupling second fitting end 120 of filter 100 to cap body portion 148 such that filter cavity 108 is coupled in flow communication with cap passageway 152. Moreover, fitting ring seal 124 may facilitate sealing a space defined between fitting 104 and housing cap 146, as shown in FIG. 5. Once housing cap 146 is coupled to filter 100, housing cap 146 may be threadably coupled to housing 144. As a result, filtering member 102 may be positioned within cavity 166 such that an annular space 174 is defined between housing 144 and filtering member 102. Moreover, cap ring seal 160 may facilitate sealing a space defined between housing cap 146 and housing 144, as shown in FIG. 5.

FIG. 6 is a chart that shows a general listing of the minimum oxygen pressure required to support self-sustained combustion of rods ignited on the bottom. This listing may aid in the selection of alternative filtering material that may be used to filter high pressure and highly flammable gases, for example, oxygen or any other desired gas.

Figure 7A:
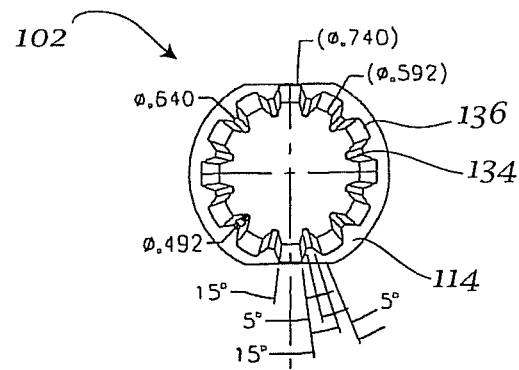
FIG. 7a is a front view of a filtering member that may be used with the system shown in FIG. 5.
Figure 7B:
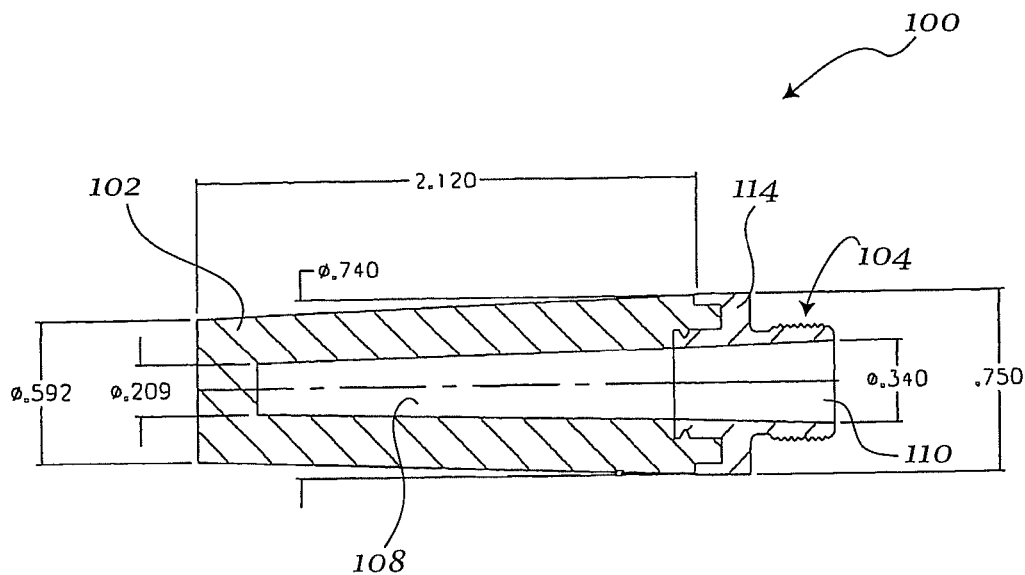
Figure 7C:
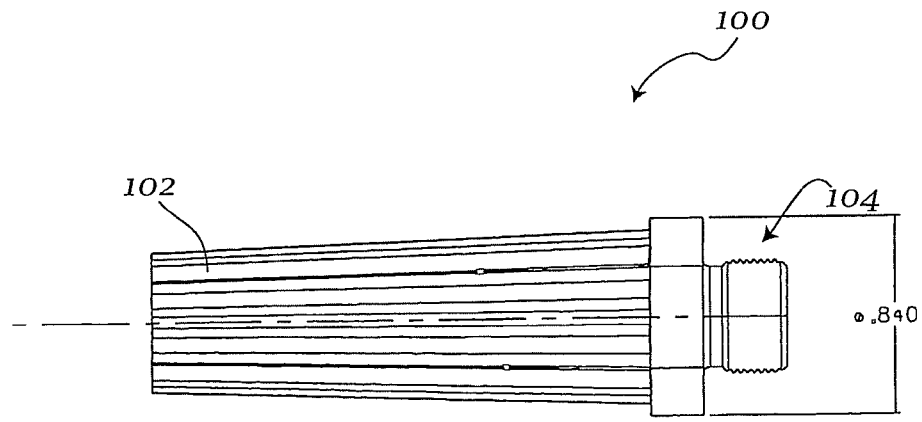

FIGS. 7a-7c show an exemplary embodiment of filter 100. It should be understood that the following description of the exemplary embodiment is non-limiting. In the exemplary embodiment, filtering member 102 has twelve flutes 130 defined in the outer surface of filtering member 102. As shown in FIG. 7a, each peak portion 136 may extend in a substantially circumferential arc about 15°. Moreover, an arc distance measure between two circumferentially adjacent peak portions 136 may also extend in a substantial circumferential arc of about 15°. Valley portion 134 may extend in a substantially circumferential arc that is about 5°. The radially outer diameter may be about 0.740 inches measured substantially near flange 114. The radially outer diameter, however, may be about 0.592 inches measured substantially near distal end 106. Moreover, the radially inner diameter may be about 0.640 inches measured substantially near flange 114. The radially inner diameter, however, may be about 0.492 inches measured substantially near distal end 106.

In the exemplary embodiment, filtering member 102 may have a length that is about 2.120 inches. Moreover, filter cavity 108 may have a first diameter measured substantially near distal end 106 that is about 0.209 inches and a second diameter measured substantially near fitting outlet aperture 110 that is about 0.340 inches. Fitting 104 may also have a first diameter that is about 0.750 inches and a second diameter that is about 0.840 inches. It should be understood to a person having ordinary skill in the art that the above-mention dimensions are for exemplary purposes and are therefore non-limiting.

Figure 8:
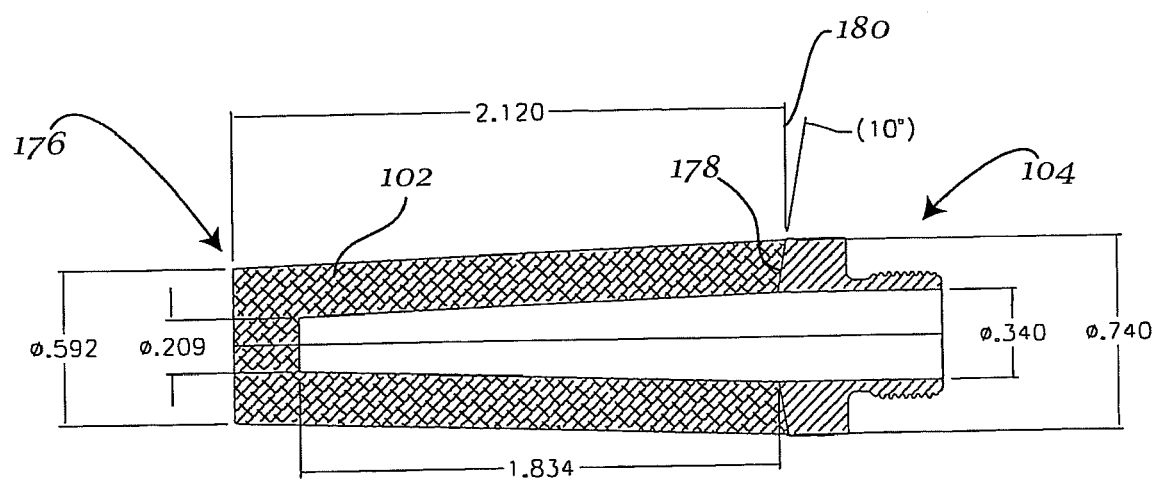
FIG. 8 is a cross-sectional side view of an alternative filtering member.

FIG. 8 is a cross-sectional side view of an alternative filter 176. Components of filter 176 are substantially similar to components of filter 100, and like components will be identified with like reference numerals. In this non-limiting example, filtering member 102 may be coupled to fitting 104, wherein fitting 104 has a contact surface 178 that may be oriented at an angle of about 10° measured with respect to a line 180 that is substantially parallel to a diameter of fitting 104. Alternatively, contact surface 178 may be oriented at any angle that enables filter 176 to function as described herein.

Figure 9A:
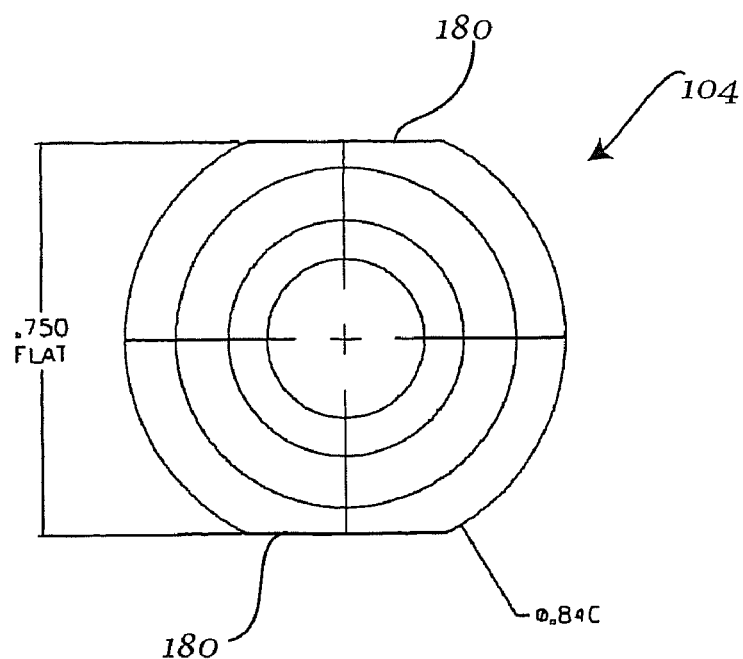
FIG. 9a is a front view of a fitting that may be used with the filtering member shown in FIG. 1.
Figure 9B:
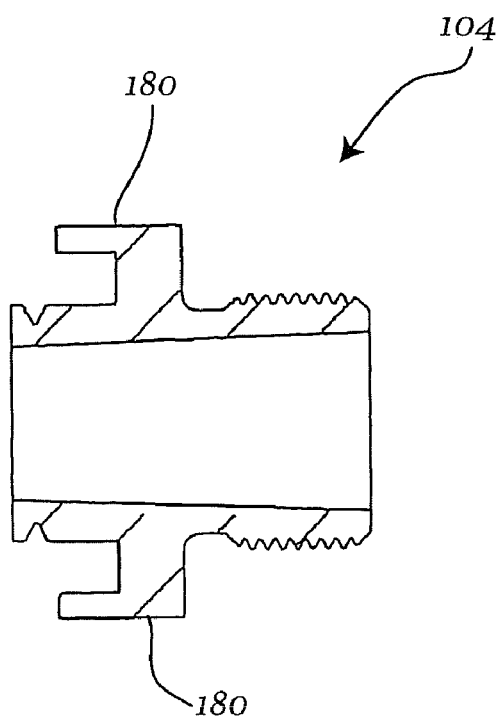

FIGS. 9a and 9b show an exemplary embodiment of fitting 104. In this non-limiting example, fitting 104 may include a pair of substantially flat sides 180 that are diametrically opposed from one another. A first diameter measured between flat sides 180 may be about 0.750 inches. A second diameter of fitting 104 measured between a pair of non-flat sides may be about 0.840 inches.

Figure 10A:
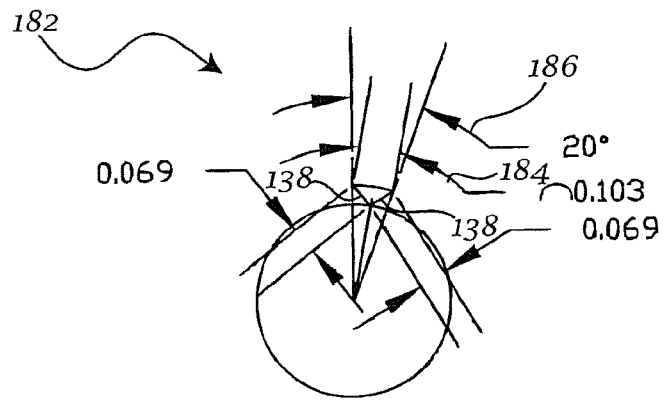
FIG. 10a is a cross-sectional front view of an alternative flute that may be used with the filtering member shown in FIG. 1.
Figure 10B:
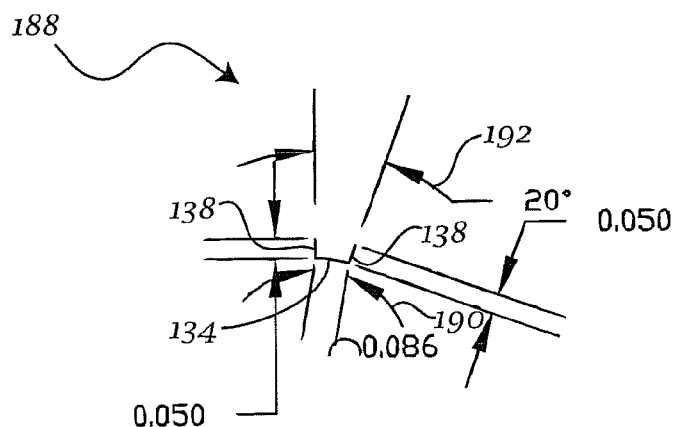
FIG. 10b is a cross-sectional front view of an alternative flute that may be used with the filtering member shown in FIG. 1.
Figure 10C:
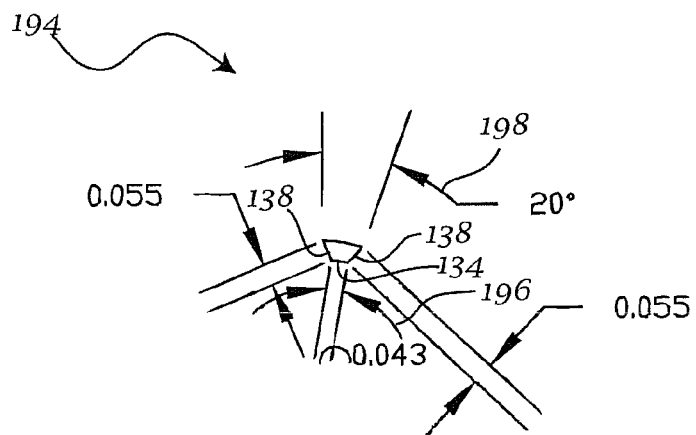
FIG. 10c is a cross-sectional front view of an alternative flute that may be used with the filtering member shown in FIG. 1.

FIGS. 10a-10c generally show alternative embodiments of flutes 130. For example, FIG. 10a shows a cross-sectional front view of an alternative flute 182 that may have a cross-sectional shape that is substantially pie-shaped. Components of flute 182 are substantially similar to components of flute 130, and like components will be identified with like reference numbers. In such an embodiment, the valley portion may be a point where flute walls 138 intersect. In the exemplary embodiment, the length of flute walls 138 may be about 0.069 inches. Alternatively, the length of flute walls 138 may be any length that enables filter 100 to function as described herein. Moreover, a circumferential arc between circumferentially adjacent peak portions 136 of flute 182 may have an arc distance that is about 0.103 inches and a circumferential arc that measures about 20°. It should be understood that the above-mentioned measurements are merely exemplary and are not limiting.

In another embodiment, FIG. 10b shows a cross-sectional front view of an alternative flute 188 that may have a cross-sectional shape that is substantially U-shaped. Components of flute 188 are substantially similar to components of flute 130, and like components will be identified with like reference numbers. In such an embodiment, valley portion 134 may have an arc length 190 that is about 0.086 inches. In the exemplary embodiment, the length of flute walls 138 may be about 0.050 inches. Alternatively, the length of flute walls 138 may be any length that enables filter 100 to function as described herein. Moreover, a circumferential arc 192 between circumferentially adjacent peak portions of flute 188 may measure about 20°. It should be understood that the above-mentioned measurements are merely exemplary and are not limiting.

In yet another embodiment, FIG. 10c shows a cross-sectional front view of an alternative flute 194 that may have a cross-sectional shape that is substantially V-shaped. Components of flute 194 are substantially similar to components of flute 130, and like components are identified with like reference numerals. In such an embodiment, valley portion 134 may have an arc length 196 that may be about 0.043 inches. In the exemplary embodiment, the length of flute walls 138 may be about 0.055 inches. Alternatively, the length of flute walls 138 may be any length that enables filter 100 to function as described herein. Moreover, a circumferential arc 198 between circumferentially adjacent peak portions of flute 194 may measure about 20°. It should be understood that the above-mentioned measurements are merely exemplary and are not limiting. Alternative measurements and specification of the sintered filters may also be used or altered according to the desired use and application of the sintered filter.

Figure 11:
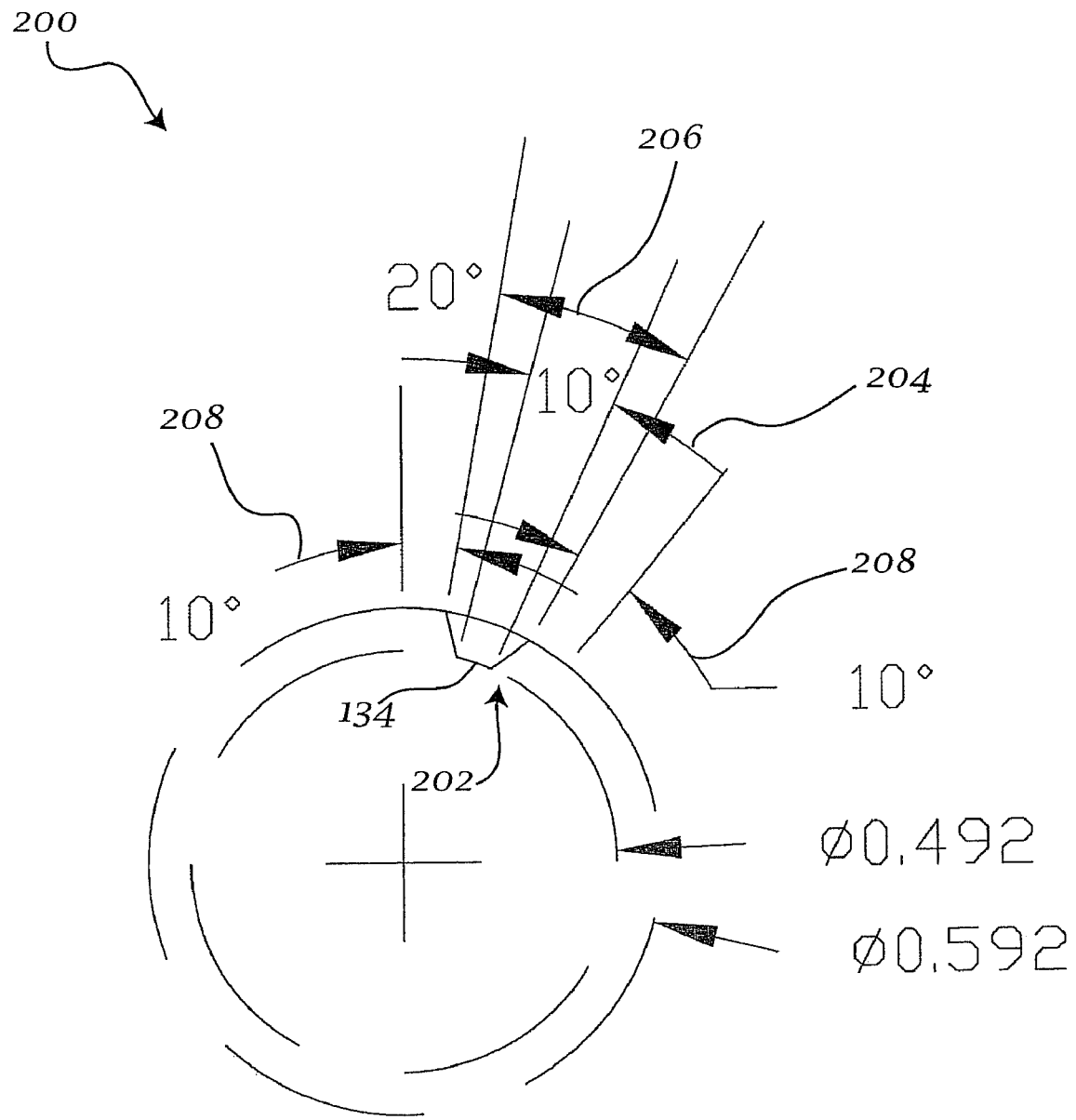
FIG. 11 is a cross-sectional front view of an alternative filtering member.

FIG. 11 is a cross-sectional front view of an alternative filtering member 200. In the exemplary embodiment, filtering member 200 has at least one flute 202 defined in the outer surface. Flute 202 may have a substantially V-shape. In this non-limiting example, filtering member 200 may have a radially outer diameter that is about 0.592 inches. Moreover, filtering member 200 may also have a radially inner diameter that is about 0.492 inches. Valley portion 134 may have a circumferential arc 204 that measures about 10°. Moreover, a circumferential arc 206 defined between circumferentially adjacent peak portions 136 of flute 202 may measure about 20°. Each peak portion 136 may extend in a substantially circumferential arc 208 that may be about 10°.

FIG. 12a is a cross-sectional end view of an alternative filtering member 210. Components of filtering member 210 are substantially similar to components of filtering member 102, and like components are identified with like reference numerals. In this non-limiting example, filtering member 210 has eight flutes 130 defined within the outer surface. A radially outer diameter measured between opposing peak portions 136 is about 0.80 inches. Moreover, each flute wall 138 may have a length of about 0.1799 inches. In the exemplary embodiment, filtering member 210 may have a length that is about 2.217 inches. As a result, filtering member 210 has a surface area of about 6.38 square inches. Further, filtering member 210 also includes filter cavity 108 defined therein. In this non-limiting example, filter cavity 108 may also be fluted and has a diameter of about 0.2562 inches. Moreover, a thickness of filtering member 210 measured from the outer surface to filter cavity 108 is about 0.1252 inches. It should be understood by a person having ordinary skill in the art that the foregoing measurements are merely exemplary and not limiting. Alternative measurements and specification of the sintered filters may also be used or altered according to the desired use and application of the sintered filter.

FIG. 12b is a cross-sectional end view of an alternative filtering member 212. Components of filtering member 212 are substantially similar to components of filtering member 102, and like components are identified with like reference numerals. In this non-limiting example, filtering member 212 has six flutes 130 defined within the outer surface. A radially outer diameter measured between opposing peak portions 136 may be about 0.80 inches. Moreover, each flute wall 138 may have a length that is of about 0.2371 inches. In the exemplary embodiment, filtering member 212 has a length of about 2.217 inches. As a result, filtering member 212 has a surface area of about 6.30 square inches. Further, filtering member 212 also includes filter cavity 108 defined therein. In this non-limiting example, filter cavity 108 may also be fluted. It should be understood by a person having ordinary skill in the art that the foregoing measurements are merely exemplary and not limiting. Alternative measurements and specification of the sintered filters may also be used or altered according to the desired use and application of the sintered filter.

FIG. 12c is a cross-sectional end view of an alternative filtering member 214. Components of filtering member 214 are substantially similar to components of filtering member 102, and like components are identified with like reference numerals. In this non-limiting example, filtering member 214 has ten flutes 130 defined within the outer surface. A radially outer diameter measured between opposing peak portions 136 is about 0.80 inches. Moreover, each flute wall 138 may have a length that is about 0.1625 inches. A radially inner flute diameter measured between opposing valley portions 134 may be about 0.5500 inches. In the exemplary embodiment, filtering member 214 may have a length of about 2.217 inches. As a result, filtering member 214 has a surface area of about 7.20 square inches. Further, filtering member 214 also includes filter cavity 108 defined therein. In this non-limiting example, filter cavity 108 may also be fluted and have a radially outer diameter of about 0.3220 inches and a radially inner diameter of about 0.2214 inches. It should be understood by a person having ordinary skill in the art that the foregoing measurements are merely exemplary and not limiting.

Figure 13:
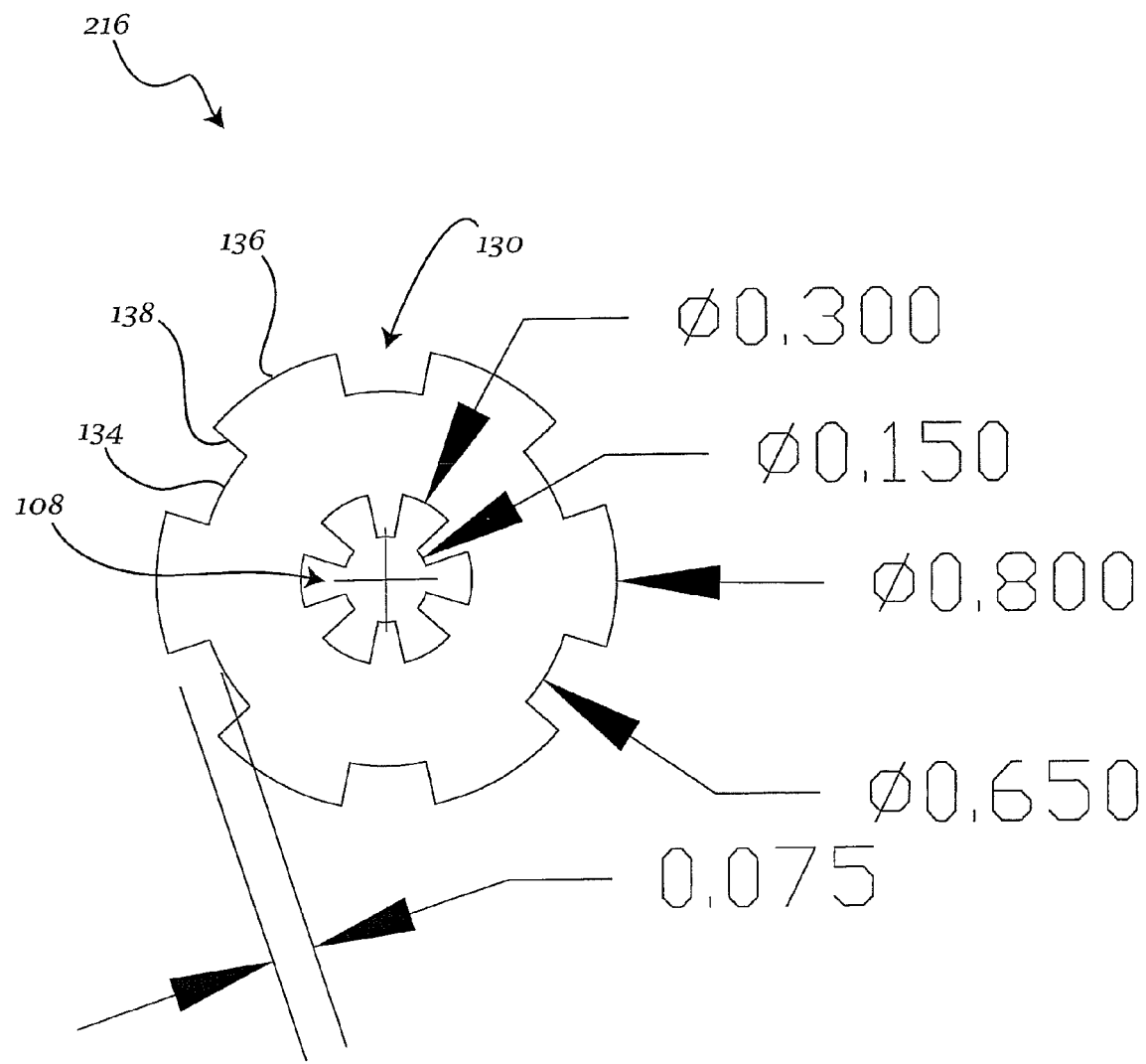
FIG. 13 is a cross-sectional end view of an alternative filtering member.

FIG. 13 is a cross-sectional end view of an alternative filtering member 216. In the exemplary embodiment, filtering member 216 has six flutes 130 defined in the outer surface. Flutes 130 may have a substantially U-shape such that filtering member 216 may have a substantially gear-shaped cross-section. In this non-limiting example, filtering member 216 may have a radially outer diameter that is about 0.8000 inches. Moreover, filtering member 216 may also have a radially inner diameter that is about 0.6500 inches. As a result, a radial depth of each flute 130 is about 0.075 inches. Furthermore, in this non-limiting example, filtering member 216 may have filter cavity 108 defined therein that may also have a substantially gear-shaped cross-section. Filter cavity 108 may have a radially outer diameter that is about 0.30 inches and a radially inner diameter that is about 0.150 inches. It should be understood by a person having ordinary skill in the art that the foregoing measurements are merely exemplary and not limiting. Alternative measurements and specification of the sintered filters may also be used or altered according to the desired use and application of the sintered filter.

During operation of an exemplary embodiment, as shown in FIG. 5, unfiltered gas may enter housing 144 through inlet aperture 162. The unfiltered gas may be channeled towards filter cavity 108. The unfiltered gas may surround the outer surface of filtering member 102. The porosity of filtering member 102, and more specifically the sintered metal such as bronze, enables the unfiltered gas to penetrate filtering member 102 and flow towards filter cavity 108. As a result, filtering member 102 facilitates filtering the unfiltered gas as the gas passes therethrough. As described above, in one embodiment, filtering member 102 may filter particles having a diameter ranging between about 0.1 µm to about 500 µm. In another embodiment, filtering member 102 may filter particles having a diameter between about 0.5 µm to about 100 µm. In yet another embodiment, filtering member 102 may filter particles having a diameter of about 10 µm. Once the gas enters filter cavity 108, the gas is substantially filtered. The filtered gas may then be channeled towards cap passageway 152 and towards cap outlet aperture 150. The filtered gas may be discharged from filtering system 142 via outlet aperture 150. As a result, filtering system 142, and more specifically filtering member 102, facilitates filtering particulate matter from unfiltered air.

The foregoing description and accompanying drawings illustrate the principles, preferred embodiments and modes of operation of the sintered filter. However, the sintered filter should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the sintered filter as defined by the following claims.

What is claimed is:

1. A method of assembling a filtering system, said method comprising:
   molding metal powder into a filtering member;
   positioning a receiving end of a fitting at least partially within the metal powder;
   heating the metal powder to a temperature that is substantially less than a melting temperature of the metal powder such that the metal powder couples to the fitting to form a filter element; and
   coupling the filter element within a cavity defined within a housing.

2. A method in accordance with claim 1 further comprising:
   threadably coupling the filter element is a housing cap; and
   threadably coupling the housing cap to the housing such that at least a portion of the filter element is positioned within a cavity defined by the housing.

3. A method in accordance with claim 1, wherein forming a filter element further comprises:
   heating the metal powder such that a filtering member is formed that includes a plurality of flutes defined within an outer surface of the filtering member and extend substantially axially along the outer surface.

4. A method in accordance with claim 1, wherein forming a filter element further comprises:
   forming a plurality of flutes that have a cross-sectional shape that is at least one of a pie-shape, a U-shape and a V-shape.

* * * * *